United States Patent [19]
Houser

[11] 3,954,048
[45] May 4, 1976

[54] HIGH PRESSURE ACTUATOR
[76] Inventor: John W. Houser, 521 Fairhill St., Willow Grove, Pa. 19090
[22] Filed: Jan. 28, 1975
[21] Appl. No.: 544,924

[52] U.S. Cl. .............................. 92/165 R; 92/169; 417/269
[51] Int. Cl.² ......................................... F16J 15/18
[58] Field of Search ............ 92/162, 164, 165, 169; 417/269

[56] References Cited
UNITED STATES PATENTS

| | | | |
|---|---|---|---|
| 2,461,235 | 2/1949 | Raymond | 417/273 |
| 2,518,787 | 8/1950 | Huhtala | 92/164 |
| 2,880,043 | 3/1959 | Landis | 92/169 |
| 3,053,594 | 9/1962 | Williamson | 92/169 |
| 3,889,578 | 6/1975 | Clerk | 91/499 |

*Primary Examiner*—William L. Freeh
*Assistant Examiner*—La Pointe G. P.
*Attorney, Agent, or Firm*—Robert R. Bunevich

[57] ABSTRACT

A high pressure, self-sealing and self-lubricating, reciprocating pump having a pair of uniformly thin wall, radially resilient, cylinders extending in parallel into adjacent cavities of a pump housing. Pistons, driven by a wobble plate and slidable in the cylinders, are of uniform diameter along their entire lengths of insertion in the cylinders on the compression stroke. The outer surfaces of the cylinders form annular spaces in the cavities which communicate with pressure chambers in a manifold operatively connected to the pump housing. Ball check valves within the manifold control the fluid flow at the inlet and outlet thereof. Bushings positioned around the cylinders intermediate the ends thereof provide resistance to skewing forces by the wobble plate. Pressure changes due to compression and suction in the pump causes the thin wall cylinder to collapse and expand about their respective pistons forming thereby a high pressure seal during compression, and a self-lubricating cylinder during suction.

7 Claims, 3 Drawing Figures

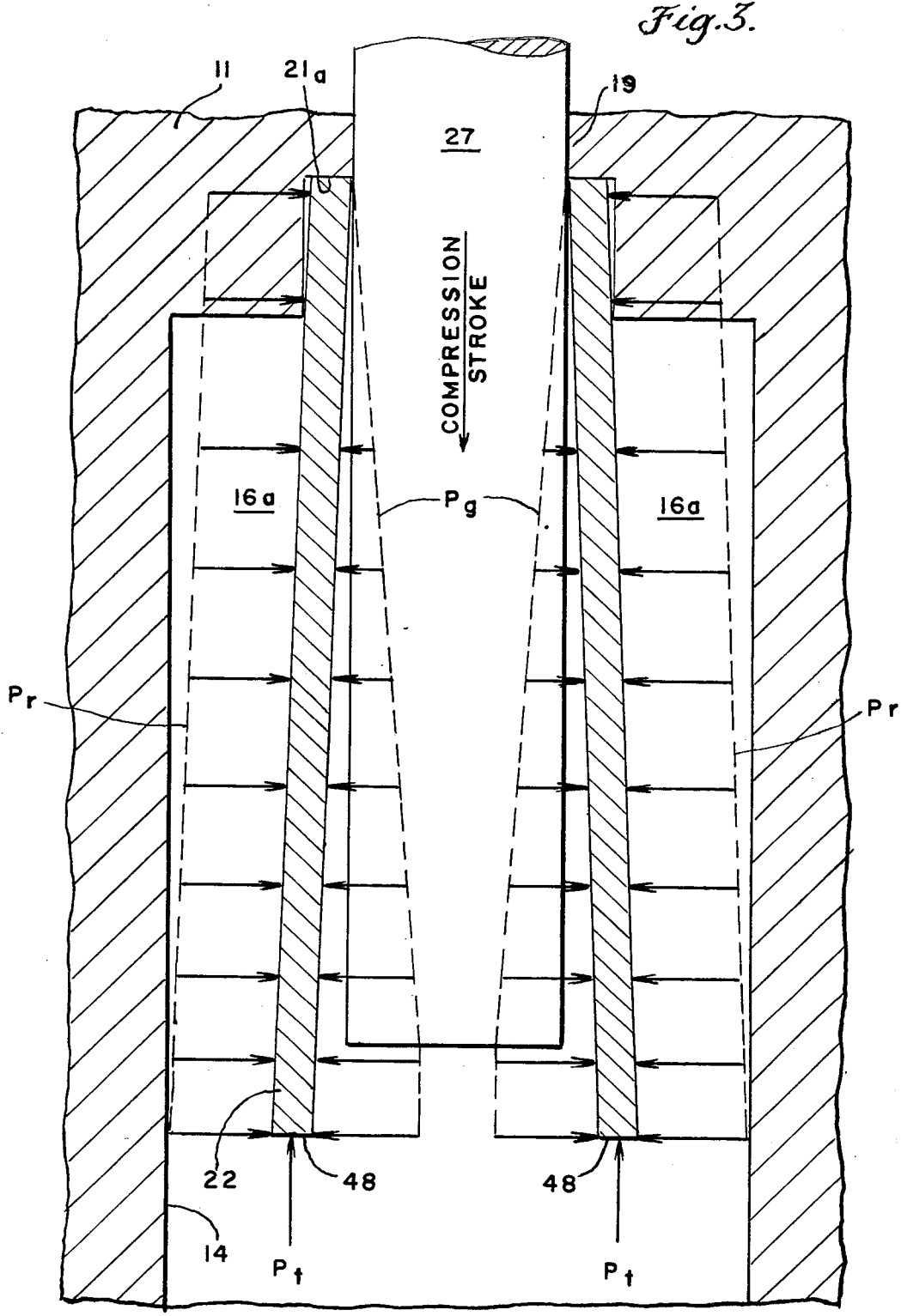

HIGH PRESSURE ACTUATOR

BACKGROUND OF THE INVENTION

The present invention relates to reciprocating pumps and more particularly to pressure-actuated seals and lubricators as applied to high pressure reciprocating pumps.

Prior art reciprocating pumps usually obtain sealing against fluid leakage around the piston by maintaining very small clearances between the sliding elements and by elastic or resilient packings between the elements. At very high fluid pressures, the clearances required become too small to afford proper lubrication between the sliding elements, or the compression required of the packings too great to permit adjacent elements to slide freely relative to each other. Various methods of sealing high pressure pump systems have been attempted including self-sealing concepts, but all have sacrificed efficient lubrication between moving parts, have introduced additional stresses within critical elements, or have limited their use to low pressure applications. Moreover, these attempts have generally produced a more costly and more complex system.

SUMMARY OF THE INVENTION

Accordingly, it is a general purpose and object of the present invention to provide a self-sealing, self-lubricating reciprocating pump system which permits relatively large, non-critical clearances between the piston and cylinder during manufacture at the same time requiring no additional sealing or packing.

Another object of the invention is to provide a self-sealing reciprocating pump system which maintains pressure integrity at very high pressures while maintaining low sliding friction between the piston and cylinder.

Still another object of the invention is to provide a self-sealing reciprocating pump system in which each stroke of the piston produces a effective lubricating fluid film about the piston while preventing air entrapment and the introduction of foreign substances.

A still further object of the invention is to provide a self-sealing reciprocating pump system in which askewed forces due to angular motion of the piston driving mechanism are compensated without degrading the self-sealing feature.

Briefly, these and other purposes and objects are achieved according to the invention by a reciprocating actuator having a piston and a thin wall, resilient cylinder seated at one end without an actuator housing. The other end of the cylinder extends into an enlarged cavity formed within the housing. The length of the piston is such that it completely fills the cylinder from the one end to the maximum insertion of the piston toward the other end. During compression, pressurized fluid urges the cylinder to collapse about the piston and form thereby a seal. During suction, the cylinder is relaxed from about the piston permitting the fluid to flow about the piston and cylinder confronting surfaces for lubrication. A circular bushing about the distal end of the cylinder provides support against skewing or turning moments as may be caused by the angular motion of the actuator driving or stroking mechanism.

Other objects, advantages and novel features of the invention will become apparent from the following detailed description of the invention when considered in conjunction with the accompanying drawings.

BRIEF DESCRIPTION OF THE DRAWINGS

FIG. 3 is an enlarged fragmentary representation of the pump of FIG. 1 superimposed with pressure diagrams.

DESCRIPTION OF THE PREFERRED EMBODIMENT

Figures 1, 2:
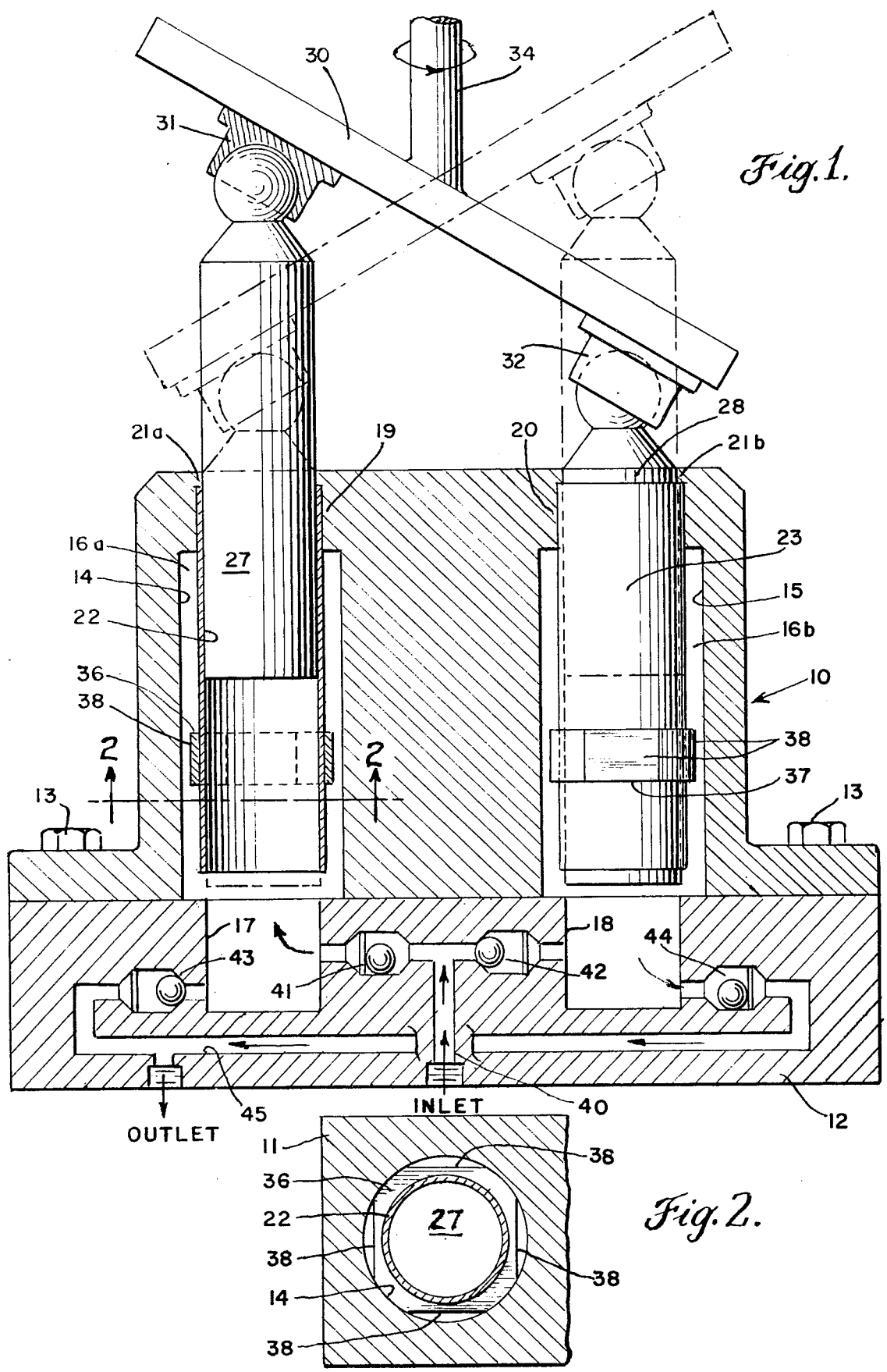
FIG. 1 represents in partial cross section a self-sealing piston-type pump constructed according to a preferred embodiment of the invention.
FIG. 2 represents a fragmentary view of the pump of FIG. 1 taken along the line 2—2 thereof.

Referring now to FIG. 1, there is shown a dual piston, reciprocating pump indicated generally by the numeral 10, comprising an pump housing 11 and a valve manifold 12 sealingly secured together by bolts 13.

The housing 11 includes two cavities 14 and 15 registering at their one ends with manifold chambers 17 and 18, respectively. The cavities 14 and 15 have shoulder sections 19 and 20 at their other ends which tightly seat the one ends of thin wall, right cylinders 22 and 23, the other ends of which extend into cavities 14 and 15 forming thereby annular spaces 16a and 16b between the cylinders and surrounding housing 11. Spaces 16a and 16b communicate with chambers 17 and 18 in manifold 12 around the other ends on cylinders 22 and 23. As will be seen hereinbelow, cylinders 22 and 23 are generally prevented from sliding within housing 11 by bosses 21a and 21b formed in shoulder sections 19 and 20.

Cylinders 22 and 23 slidably receive pistons 27 and 28 which are of uniform diameter along their lengths of entire insertion in their corresponding cylinders. The pistons' maximum inward excursion during compression are such that sufficient clearance remains to permit free fluid flow between the manifold chambers and the annular spaces.

The pistons 27 and 28 are drivingly connected to drive shaft 34 through ball-and-socket joints 31 and 32 and wobble plate 30. As shaft 34 rotates, plate 30 wobbles causing pistons 27 and 28 to reciprocate in cylinders 22 and 23 in the manner shown in dotted outline in the drawing. Due to the skewed driving forces on pistons 27 and 28, bushings 36 and 37 are fixed respectively between cylinders 22 and 23 and the housing 11 near the other ends of the cylinders for the purpose of transferring the reacting forces from the housing 11 and thereby maintain the pistons aligned. As best seen in FIG. 2, the bushings include flat lands 38 for maintaining fluid communication in annular spaces 16a and 16b.

Inlet and outlet flow of the actuator 10 is controlled in the chambers 17 and 18 by a conventional valve arrangement. Fluid is received through passage 40 and ball check valves 41 and 42, and exits through ball check valves 43 and 44 and passage 45. The valves 41 and 43, associated with piston 27 are shown with the balls in the suction stroke position, and the balls of valves 42 and 44 associated with piston 28 in the compression stroke position. Arrows within passages 40 and 45 represent the direction of flow for the valve positions shown.

Operation of the disclosed embodiment according to the invention may best be described with reference to the superimposed pressure diagrams shown in FIG. 3 in which the effects of the pressure gradients are greatly exaggerated. The piston 27 is shown during a compression stroke creating an instantaneous pressure $P_t$ in cavity 14 and chamber 17. Pressure $P_t$, exerted against the lower end surface 48 of cylinder 22, forces the other end against boss 21a forming thereby a fluid tight seal between annular space 16a and the upper end of the housing 11. There being no fluid flow past boss 21a, the pressure $P_t$ remains constant within space 16a. Since this pressure is external of the cylinder 22, radially inward pressure $P_r$ is exerted against the entire outer surface of cylinder 22. As will be noted, however, the external force is offset by an internal pressure gradient $P_g$ which is equal to $P_t$ at the lower end of the cylinder 22, but diminishes to zero at the upper end. That is, during a compression stroke, the piston 27 tends to force the fluid downward on the inside surface of cylinder 22, but as the pressure $P_t$ increases the fluid tends to flow back. This dynamic condition has the net effect of producing the pressure gradient $P_g$ along the inner surface of cylinder 22. Due to the pressure gradient, the pressure at the upper end is greatly reduced and a pressure differential results between the inside and outside surfaces of the cylinder 22. This causes the cylinder to collapse about the piston 27 with increasing force from bottom to top, and forms thereby a tight seal between the piston and the inner surface of cylinder 22, particularly at the upper end where the differential pressure is greatest. During the suction stroke, the pressure $P_t$ is of course reduced at the lower end of piston 27 causing a reversed pressure gradient $P_g$ along the inside of the cylinder. The net effect causes cylinder 22 to expand away from piston 27 with increasing force from the bottom to the top. The seal between the piston and cylinder is somewhat reduced, but sealing is usually not critical at the lower pressures usually contemplated during the suction stroke.

It is essential that the wall thickness of the cylinder be selected to retain rigidity along its length as the piston reciprocates while, at the same time, be capable of contracting and expanding radially about the piston with changes in pressure differential.

Some of the many advantages and novel features of the invention should now be apparent. For example, the collapsibility of the thin wall cylinder about the entire length of the piston permits relatively large tolerances between the piston and the cylinder thereby reducing manufacturing costs of precision machining. The pump is self-lubricating and self-sealing while maintaining pressure integrity at very high pressures. The simplified construction and few parts required manifests ease of manufacture, maintenance and repair. No special compression-type seals are required. Optimum lubrication about the pistons is provided in the the thin wall cylinders literally expand and contract about the piston during suction and compression strokes. That is, the actuator "breathes" on each cycle insuring formation of a fluid film on the piston at all times and low friction contact between actuator elements.

Of course it will be understood by those skilled in the art that many variations and modifications of the invention may be made by those skilled in the art without departing from the spirit and scope of the invention as herein described and claimed.

I claim:
1. A self-sealing hydraulic pump, comprising:
   a housing forming a cavity;
   a valve manifold operatively connected to said housing for controlling fluid flow to and from said cavity;
   a thin wall cylinder within said cavity sealingly secured at one end to said housing forming a space in said cavity around the outer surface of said cylinder freely communicating to within said cylinder; and
   a piston slidable in said cylinder and having a uniform diameter for the maximum insertion length from said one end thereof.

2. A self-sealing hydraulic pump according to claim 1 further comprising:
   said cylinder having a wall resilience for radially expanding and contracting relative to said piston with the compression and suction strokes, respectively.

3. A self-sealing hydraulic pump according to claim 2 further comprising:
   support means positioned intermediate the length of said cylinder within said space between said housing and said cylinder.

4. A self-sealing and self-lubricating piston pump comprising:
   a pump housing having a compression chamber formed therein;
   a resilient cylinder within said chamber sealingly seated at one end thereof in the wall of said housing and forming a continuous space bounded by the outer surface of said cylinder and the wall of said housing and freely communicating to within said cylinder; and
   a piston slidable in said cylinder and having a constant diameter along the entire length of insertion from said one end in said cylinder during the compression stroke;
   whereby the chamber pressure during the compression and suction strokes causes said cylinder to collapse and expand, respectively, about said piston maintaining thereby pressure integrity in said chamber and a fluid film between said piston and said cylinder.

5. A self-sealing and self-lubricating piston pump according to claim 4 further comprising:
   said housing having inlet and outlet passages formed therin and pressure responsive check valves for controlling the fluid flow through said chamber.

6. A self-sealing and self-lubricating piston pump according to claim 5 further comprising:
   said cylinder having a right cylinder configuration and seated in a recessed shoulder in said housing wall.

7. A self-sealing and self-lubricating piston pump according to claim 6 further comprising:
   support means secured about said cylinder between the outer surface of said cylinder and the confronting surface of said housing wall for preventing movement of said cylinder.

* * * * *